Aug. 11, 1931.  W. C. KEYS  1,818,715
CUSHION CONNECTION
Filed Aug. 15, 1928
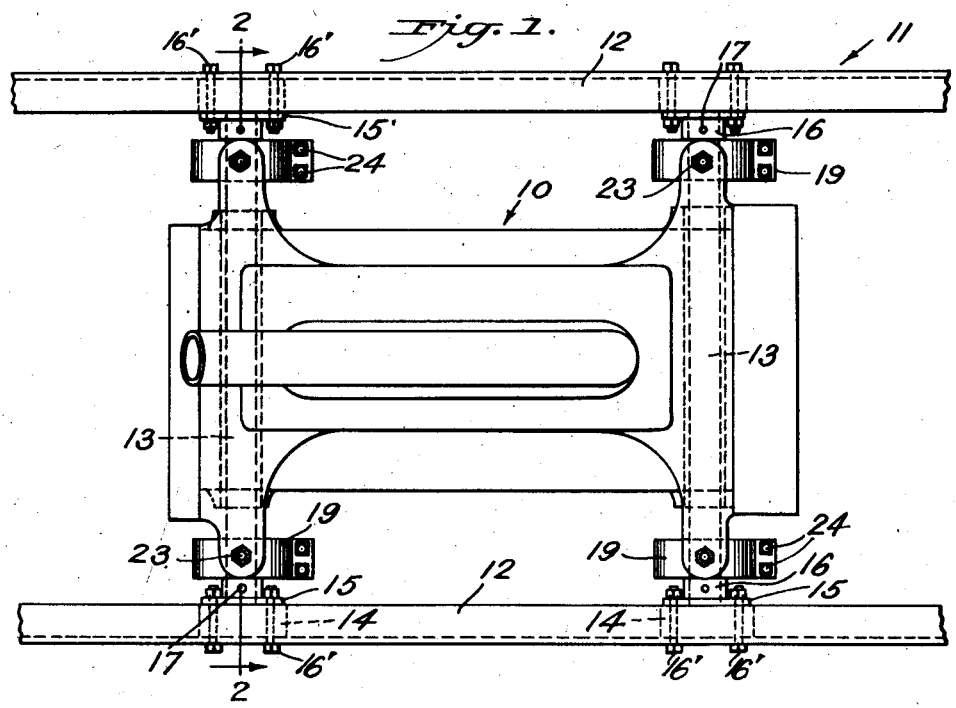
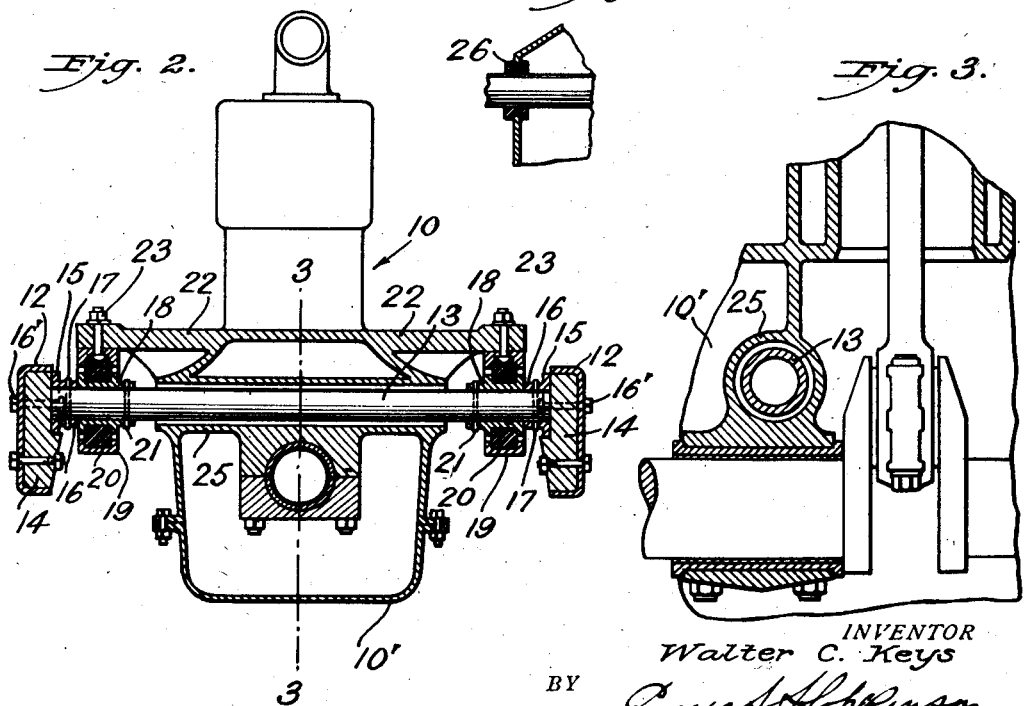
INVENTOR
Walter C. Keys
BY
ATTORNEY Patented Aug. 11, 1931

1,818,715

UNITED STATES PATENT OFFICE

WALTER C. KEYS, OF DETROIT, MICHIGAN, ASSIGNOR TO THE MECHANICAL RUBBER COMPANY, OF CLEVELAND, OHIO, A CORPORATION OF OHIO

CUSHION CONNECTION

Application filed August 15, 1928. Serial No. 299,860.

This invention relates in general to non-metallic connections, and particularly to a combined non-metallic motor mounting and bracing device for the frame of a motor vehicle.

One object of the invention is to provide a motor mounting adapted to substantially eliminate the transfer of high frequency small amplitude vibrations between the motor and the chassis frame, combined with means for bracing the chassis frame adjacent to the motor, whereby to stiffen the frame at this point against distortion due to the weight of the motor or other causes, and to prevent weaving of the frame which occurs when an automobile is driven at an angle across an obstruction or ditch tending to twist one end of the frame out of the horizontal plane.

Another object is to provide a non-metallic motor mounting and frame bracing device combined to form a unit with the motor, so that the whole assembly may be easily installed by the simple expedient of bolting the opposite ends of the bracing means to the side rails of the chassis frame. The braces are preferably in the form of tubular cross members arranged to extend transversely through suitable clearance openings in the motor. The motor is fastened to the tubular cross members through the medium of any satisfactory type of non-metallic connection, and the clearance openings are preferably in the form of hollow housings so that oil will not escape from the interior of the motor. Two tubular cross members are contemplated, that is, one at the front and one at the rear of the motor, but it is obvious that one cross member could be used with some other means to hold the motor by a three point suspension, as will be readily understood by those skilled in the art.

Further objects and advantages will appear upon a consideration of the following specification and the accompanying drawings in which latter:

Fig. 1 is a plan view of a motor and chassis frame provided with the present invention;

Fig. 2 is a cross section on the line 2—2 of Fig. 1;

Fig. 3 is an enlarged cross section on the line 3—3 of Fig. 2, portions being broken away; and Fig. 4 is a fragmental detail.

Referring to the drawings which illustrate one embodiment of the invention, the numeral 10 indicates generally a motor adapted to be installed in a chassis frame 11 which is herein shown as having the usual channel-section side rails 12. In order to brace the chassis frame 11 to prevent spreading or distortion of the side rails 12 due to the load of the motor 10 or other causes, there is provided a pair of cross members 13, preferably tubular, extending between the side rails 12, the opposite ends of the cross members 13 being secured to the side rails in any satisfactory manner. For example, the securing means may include filler blocks 14 occupying the channels of the side rails 12 and brackets 15 having sockets 16 adapted to receive the ends of the cross member 13, the brackets having flanges for fastening them to the blocks 14 and the side rails 12 such as by bolts or rivets passing through the blocks and the side rails as indicated at 16'. The ends of the cross members may be secured within the sockets 16 by pins 17 or in any other suitable manner. The cross members 13 thus form with the side rails 12 a rectangular construction providing substantial bracing of the frame portions which must support the weight of the motor, and prevent torsional twist of the frame side members out of the horizontal plane.

In addition to their function of bracing the chassis frame 11, the cross members 13 also provide supports upon which the motor 10 is adapted to be mounted through the medium of yielding non-metallic means of connection. This yielding connection may comprise pairs of metal collars respectively designated 18 and 19 having cooperating channels in which there is disposed a non-metallic insulating ring such as rubber composition 20, the inner collar 18 being secured to the cross member 13 by any suitable means such as a pin 21, and the outer collar being preferably anchored to supporting arms 22 of the motor 10 by means of bolts 23. The outer collar 19 may be split and provided with adjustable fasteners 24 which firmly secure the two collars and the interposed rubber 20 together to the proper degree of tightness so as to obtain stability while retaining the yielding quality of the rubber. While this style of yielding connection provides one satisfactory way of mounting the motor on the cross members 13, this form of construction is not essential to the invention, and any other satisfactory type of yielding connection may be substituted for the one described.

Due to the fact that the cross members 13 extend transversely across the position of the lower portion of the motor, in this instance the crank case 10', it is obvious that some provision must be made for allowing the cross members to pass through the crank case free and clear of the crank case itself and all working parts therein, while at the same time making provision for effecting an oil tight seal. For this purpose the motor is provided with transverse openings which are preferably in the form of hollow housings 25 which may be cast integral with the crank case 10', the interior bore of the housings being sufficiently larger than the diameter of the cross members 13 as to be free of contact therewith throughout the length of the cross members. Attention in this connection is directed particularly to Figs. 2 and 3. It will be observed that the metal collars 18 and 19 and the interposed rubber composition 20 form a yielding suspension for the motor 10 and maintain the latter out of contact with the cross members 13. The housings 25 which extend through the motor 10 obviously prevent the lubricating oil from working out of the crank case. In some cases it may be found advantageous to dispense with the tubular housings 25 and project the cross members 13 through openings in the opposite sides of the crank case such as indicated in Fig. 4, and provide a sealing device for instance rubber or a gasket 26 where the sides of crank case pass the tubular cross members 13.

From the foregoing description it will be seen that the motor 10, the cross members 13 and the non-metallic means of connection between the motor and the cross members are combined in the form of a unit which may be easily assembled apart from the chassis frame 11 and then dropped into position thereinto, the bolts 6 being adapted to hold the assembly rigidly to the side rails 12 and thereby provide a yielding suspension for the motor combined with effective and simple means for bracing the side rails 12 against the various forces tending to cause distortion of the chassis frame especially adjacent to the motor 10.

In conclusion it is to be understood that the present invention is not confined to the exact details illustrated and described herein, but is capable of embodiment in numerous variations and modifications within the scope of the appended claims.

Having thus described my invention, what I claim and desire to protect by Letters Patent is:

1. A combined non-metallic motor mounting and re-inforcing means for the side rails of a vehicle frame, comprising in combination, cross members extending between and secured at their opposite ends to the side rails, the motor being provided with clearance openings through which the cross members extend, non-metallic yieldable means adapted to connect the motor at its opposite sides to the cross members and maintain the latter out of contact with the adjacent surfaces of the clearance openings, and means for sealing said openings.

2. A combined non-metallic motor mounting and re-inforcing means for the side rails of a vehicle frame, comprising in combination, cross members extending between and secured at their opposite ends to the side rails, the motor being provided with housings having clearance passages through which the cross members extend, said housings being arranged to seal the passages from the interior of the motor, said motor being provided with supporting arms, and non-metallic yieldable connections between said supporting arms and the opposite ends of said cross members, said connections being adapted to maintain the walls of the clearance passages out of contact with the cross members.

3. A combined non-metallic motor mounting and re-inforcing means for the side rails of a vehicle frame, comprising in combination, tubular cross members extending between and secured at their opposite ends to the side rails, the motor having a crank case provided with housings having openings through which the cross members extend, the housings being arranged to extend from side to side within the crank case and merging with the side walls to form seals, the openings being larger than the cross members, whereby to clear the same, said motor having supporting arms extending adjacent the cross members, and non-metallic yielding means connecting the arms to the adjacent portions of the cross members and maintaining said openings substantially concentric with respect to said cross members.

4. In combination, a torsion-resisting cross member for a frame, a mechanism provided with an opening having clearance around said cross member, and a cushioning mounting carried by said cross member external of said opening and supporting said mechanism, said mounting including non-metallic yielding material interposed between said cross member and said mechanism.

5. In combination, a structural support, a mechanism provided with an opening having clearance around said support, and a non-metallic cushioning connection interposed between said mechanism and said structural member externally of said opening.

Signed at Detroit, county of Wayne, State of Michigan, this 2nd day of August, 1928.

WALTER C. KEYS.